(12) United States Patent
Li et al.

(10) Patent No.: US 9,129,009 B2
(45) Date of Patent: Sep. 8, 2015

(54) RELATED LINKS

(75) Inventors: Peisheng Li, Beijing (CN); Qi Zhu, Mountain View, CA (US); Luo Yu, Beijing (CN); Xin Zhou, Beijing (CN)

(73) Assignee: Google Inc., Mountain View, CA (US)

( * ) Notice: Subject to any disclaimer, the term of this patent is extended or adjusted under 35 U.S.C. 154(b) by 521 days.

(21) Appl. No.: 13/288,003

(22) Filed: Nov. 2, 2011

(65) Prior Publication Data
US 2012/0109932 A1    May 3, 2012

(30) Foreign Application Priority Data
Nov. 3, 2010    (WO) ................ PCT/CN2010/078385

(51) Int. Cl.
*G06F 7/00*    (2006.01)
*G06F 17/30*    (2006.01)

(52) U.S. Cl.
CPC ................................. *G06F 17/30616* (2013.01)

(58) Field of Classification Search
CPC .......... G06F 17/3053; G06F 17/30533; G06F 17/30675; G06F 17/30; G06F 17/30616
See application file for complete search history.

(56) References Cited

U.S. PATENT DOCUMENTS

| | | | |
|---|---|---|---|
| 6,691,163 B1 | 2/2004 | Tufts | |
| 7,797,447 B1 | 9/2010 | Schilit et al. | |
| 8,244,750 B2 | 8/2012 | Gade et al. | |
| 8,412,726 B2 | 4/2013 | Yan et al. | |
| 2002/0194166 A1* | 12/2002 | Fowler | 707/3 |
| 2006/0122997 A1* | 6/2006 | Lin | 707/5 |
| 2010/0082673 A1* | 4/2010 | Nakano et al. | 707/776 |
| 2010/0115396 A1* | 5/2010 | Byron et al. | 715/234 |
| 2010/0198840 A1* | 8/2010 | Basu et al. | 707/749 |
| 2011/0131207 A1* | 6/2011 | Jonsson | 707/730 |

* cited by examiner

*Primary Examiner* — Azam Cheema
(74) *Attorney, Agent, or Firm* — Fish & Richardson P.C.

(57) ABSTRACT

Methods and systems for providing related links are disclosed. In one aspect, a method comprises: retrieving textual information associated with a web page upon loading of the web page at a client; extracting a set of keywords from the received textual information; determining one or more keywords of the set of keywords using a keyword repository that maintains a list of keywords and their respective rankings; sending the one or more keywords as a search query to a search engine to obtain a list of search results ordered by their respective rankings; returning a number of search results with the highest rankings to the client for display on the web page.

17 Claims, 4 Drawing Sheets

```
<div id="relatedlinks_container_div"></div>
<script language=javascript defer>
  var escFun = window.encodeURIComponent ? window.encodeURIComponent : escape;
  var relatedlinks_js = document.createElement("script");
  relatedlinks_js.setAttribute("charset", "utf-8");
  relatedlinks_js.src = "http://relatedlinks.googlelabs.com/client/client.js?url=" +
      escFun(document.URL) + "&referrer=" + escFun(document.referrer) +
      "&relatedlinks_id=10123_802570575784575209&title=" + escFun(document.title);
  document.getElementsByTagName("head")[0].appendChild(relatedlinks_js);
</script>
```

FIG. 3

RELATED LINKS

CROSS-REFERENCE TO RELATED APPLICATION

This application claims priority under 35 U.S.C. §119 to PCT Application Serial No. PCT/CN2010/078385, filed on Nov. 3, 2010, to inventors Peisheng Li, Qi Zhu, Luo Yu and Xin Zhou and titled Related Links.

BACKGROUND

This specification describes technologies relating to providing related links in a web page.

Typically, web pages can either be static HTML web pages, or dynamic web pages that are created at the server side when they are requested. Examples of dynamic web pages include web pages written in ASP, ASPX, or JSP.

Regardless of whether the web is static or dynamic there are cases where website owners want to display on their web pages links to other web pages within the same web domain or one or more other domains whose contents are related to the current web page, for example, to increase the page views on these web sites or pages. A conventional technique for presenting web page links is for a user (e.g., a web site owner or developer) to manually identify related web pages and then embed links to these web pages on one or more web pages of the user's web site. The user can identify related web pages by conducting searches within the same web domain or one or more other domains based on the contents in the web pages, for example, by manually selecting some keywords from the contents on his web pages as most representative of the contents. These keywords are used as a search query to a search engine. The user can then manually select from the obtained search results. However, If the web site has a large number of web pages, and the textual contents in each web page is different from one another, it can be inconvenient for a web site owner to manually search for such related web pages and embed the links to them in the web pages during creation and setting up of the web site.

On the other hand, for some conventional web pages, especially for some dynamically created web pages, the contents on the web page may change when visited at different times. This can be due to changes to the text data during the time interval between different visits. In this case, it is difficult for the web site owner to predict what kind of content will be presented on the web page to the user in the future, hence it will be difficult for the user to find the web pages that can be considered related to the web page and embed them in the page.

SUMMARY

In general, one aspect of the subject matter described in this specification can be embodied in a method comprising: retrieving textual information associated with a web page upon loading of the web page at a client; extracting a set of keywords from the received textual information; determining one or more keywords of the set of keywords using a keyword repository that maintains a list of keywords and their respective rankings; sending the one or more keywords as a search query to a search engine to obtain a list of search results ordered by their respective rankings; and returning a number of search results with the highest rankings to the client for display on the web page.

In another aspect, the one or more keywords selected from the original search results are sent to the search engine to perform a search within the same web domain as that for the web page, so that the obtained related links presented in the gadget are directed to only the web pages within the same web domain as the web page to be loaded.

In a further aspect, the method as defined above can further include: returning the one or more keywords together with the number of search results to the client for display in the gadget, the displayed one or more keywords being selectable to perform related searches within the same domain coverage as that for the related links.

In another aspect of the present invention, a system for providing related links is provided. The system comprises: a client comprising a text extractor, the text extractor configured to extract textual information related to a web page and send it to a server for requesting related links; the server comprising a keyword extractor, a related links module and a presentation module, and connected to a keyword repository and a search engine, the keyword extractor configured to extract keywords from the textual information received from the client by consulting the keyword repository, the related links module configured to retrieve search results from the search engine by sending at least one of the extracted keywords as the search query, the presentation module configured to present selected search results from the search engine to the client according to the layout requirements from the client.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows an example section of sample JavaScript code in a web page for retrieving links related to the web page.

Like reference numbers and designations in the various drawings indicate like elements.

DETAILED DESCRIPTION

Figure 1:
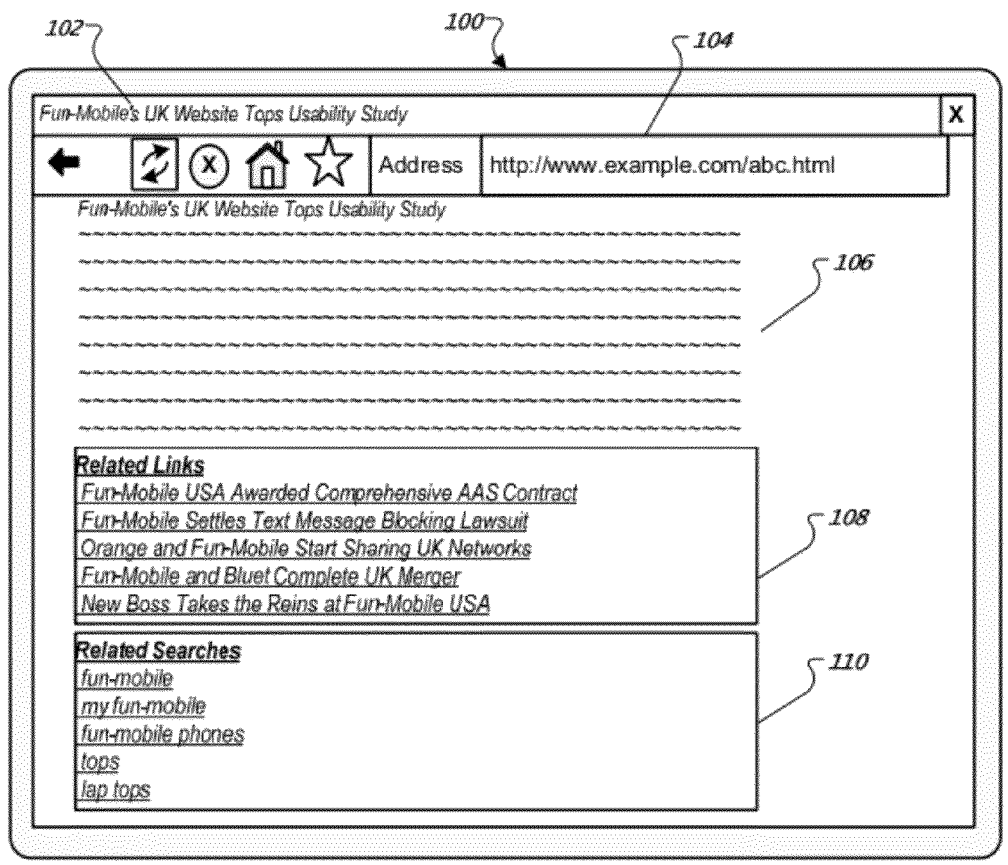
FIG. 1 illustrates an example web page with an embedded gadget of related links.

FIG. 1 illustrates an example web page 100 with an embedded gadget 108 of related links. In this specification, "gadget" refers to a miniature object or component that can be placed on a web page and offer dedicated functions. Within the browser displaying this sample web page 100, address "www.example.com/abc.html" is the URL (Uniform Resource Locator) of the web page, representing the particular network location where this web page is resided. The web page has a title 102 called "Fun-Mobile's UK website Tops Usability Study", which is displayed in the top horizontal space of the web browser. In a body portion 106 of the web page, the title, and the entire body text of the article (for easy illustration, the actual body text in this section is replaced with tilde lines) are listed.

Viewers of the web page 100 are presented with additional information related to the contents in this web page. In particular, the web page 100 includes an embedded section (e.g., a gadget 108) that provides a list of related links that are identified as related to the current web page based on some criteria. In some implementations, the list of links in the gadget 108 directed to other web pages that are considered related to the current web page is provided dynamically upon each loading or refreshing of the web page 100. Identification of links as related is based on particular criteria as described in greater detail below.

In some implementations, these other web pages identified as related to the current web page are limited to particular web pages residing on the same web domain as the current web page, i.e., for this example, within the same domain "www.example.com". Alternatively, the user can configure the gadget 108 to limit those related links to direct to web pages under a group of selected web domains, including or excluding the web domain where the current web page is located. The gadget 108 can also be configured to display links relating to web pages that could have come from any web domain on the web.

In some implementations, another gadget 110 (or alternatively a separate portion of the gadget 108) can provide links to related searches. For example, the displayed links can include keywords identified from the web page. Unlike the related links provided in the gadget 108, which direct the user to a specific web page based on search results based on a keyword automatically determined at the server side, these keyword links allow the viewer to perform a related search using the displayed one or more keywords as the query.

For example, based on the analysis of the textual information related to the web page as shown in FIG. 1, the server has determined that these keywords "fun-mobile", "my fun-mobile", "fun-mobile phones", "tops", and "lap tops" are the top five most important topical words or phrases that can represent the contents on the web page. The viewer can select one from these keyword links in order to be presented with a search results page responsive to the one or more keywords as a search query. The search can be performed, e.g., by a search engine, within the same domain coverage as that for the related links in gadget 108. The user can then view the search results to find a web page of interest. In some implementations, other keywords can be associated with the displayed related search text.

Though the gadget of 108 and 110 are shown in FIG. 1 as separate gadgets, the related links in gadget 108 and the keywords in gadget 110 for performing related searches can be displayed within the same gadget.

Figure 2:
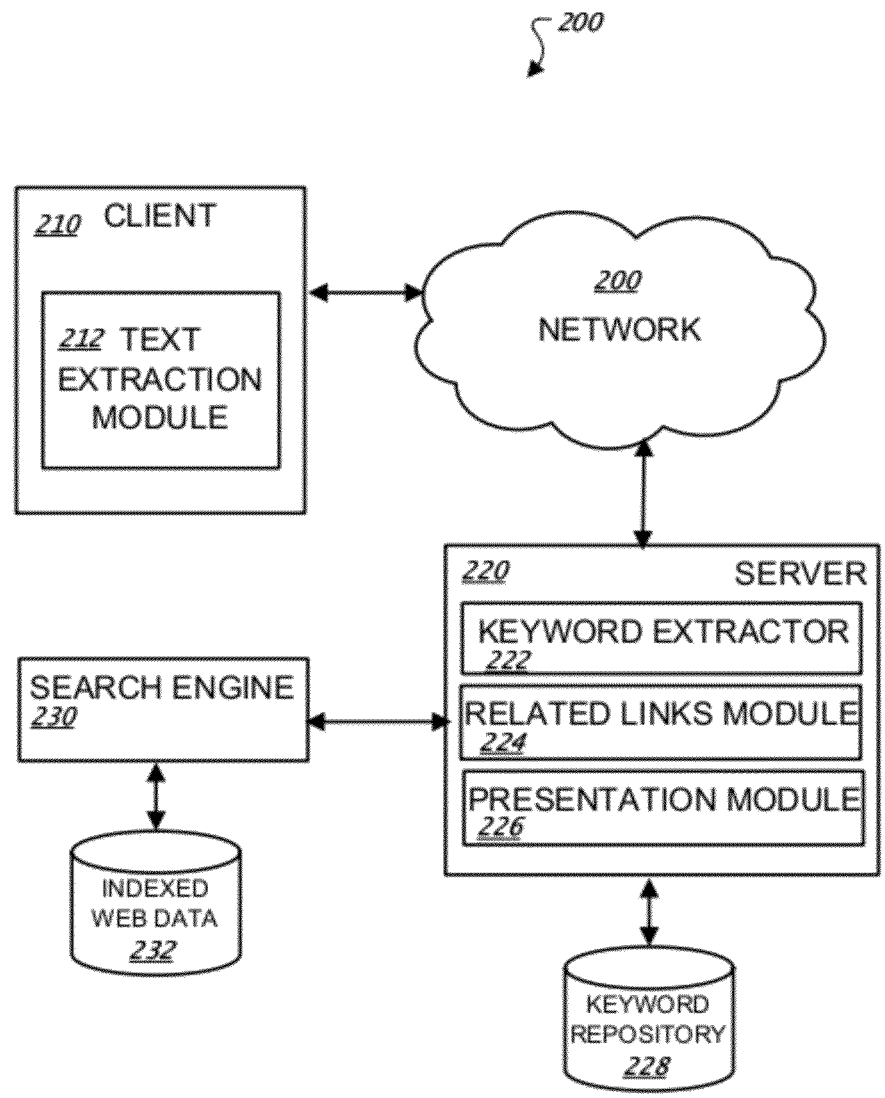
FIG. 2 is a schematic overview of an example system.

FIG. 2 is a schematic overview of an example system 200. In the system 200, a client 210 is connected to a server 220 using a network 200. The client 212 contains a text extractor 212, which is configured to extract textual information that is related to a web page (for example, when the web page is being loaded on a browser of the client 210) and send this information to the server 220 for further processing.

The server 220 is a data processing apparatus that includes three modules: a keyword extractor 222, a related links module 224 and a presentation module 226. The keyword extractor 222 parses textual information received from the client. One or more keywords are extracted from the received textual information. Respective rankings of each of these keywords are identified using a keyword repository 228, and selecting one or more keywords with the highest rankings. The keyword repository 228 is a repository that stores a list of keywords and their respective rankings. Thus, the ranking of a particular received keyword (e.g., a keyword extracted from a particular web site or page) can be identified by matching the corresponding keyword in the repository with its respective ranking.

The related links module 224 is configured to send the obtained one or more keywords, which are topical words or phrases considered representative of the web contents of the web page to be loaded at the client, to a search engine 230, which is connected to the server 220, for example, either using a private communication link or using the network 200.

The search engine 230 performs one or more searches based on respective query composed of one or more of the keywords obtained by the keyword extractor 220 and return the search results to the server 220. The presentation module 226, upon receiving the search results responsive to the one or more queries, selects results from the received search results (e.g., a top K search results), appropriately arranges the selected search results in a layout suitable for display, and returns the selected search results to the client for display, for example, in a predefined gadget in the web page.

Additionally, if the function of related searches is also enabled, the presentation module 226 will also forward the one or more keyword links, selected by the keyword extractor 220 and used by the related links module 224, to the client for display in the section for related searches.

FIG. 3 shows an example section of sample JavaScript code embedded in the HTTP source code of a web page for retrieving links related to the web page. The first line of the code section defines a division, or a "gadget" as referenced in this specification, in an HTML document, either static or dynamically generated, to display the obtained related links. In some implementations, the size of this section depends on the number of related links the site owner plans to embed within the display region (e.g., within the gadget). For example, the user (e.g., a sight developer or manager) may want to put at most five related links in this section, with each related link displayed on a single line in the gadget. The user can therefore determine the height of the display region or gadget at substantially five lines of texts in a certain font. Additionally, if the keywords for performing related searches are also to be shown in the same gadget, the space for arranging these keywords will need to be considered in determining the size of this gadget.

The exact data to populate this gadget or the <div> section are obtained through the JavaScript code provided between the tags <script> and </script>. In the third line of the sample script, a variable "escFun" is defined as the result of a function converting an obtained line of texts to be safely sent under the HTTP protocol. The fourth through the eighth lines are definitions of the variable "relatedlinks_js" and its various attributes. The ninth line of the code then uses this variable to retrieve the exact HTTP code from the server for displaying the search results and/or keywords.

In the definition of the attribute ".src" for the variable "relatedlinks_js", the following four parameters are sent to a server (e.g., server 220): the URL of the current web page, the URL from the referrer of the web page, the identifying number of the particular request, and the title of the present web page. The URL of the current web page is sent to the server in order for the server to determine whether any related link retrieved by the search conducted at the server with a search engine (e.g., search engine 230) is within the same web domain as that for the web page to be viewed. If not, the server may either remove this result from the displayed list of related links or distinguish it from other related links by highlighting the link to this result. This will make it easy for the viewer to identify a related link in the gadget that comes from the same web domain as the web page being opened.

Alternatively, the URL of the current web page may not need to be specifically sent in the request. The server can identify the web domain of the requesting web page by checking the source of the request. Further, the referrer of the current web page refers to a search result page in which a link to the current web page is included as one of the results and the user has selected this link to open the current web page. The URL of the referrer therefore includes the search query used to perform that previous search. In this invention, the URL of the referrer is forwarded to the server since, in the event that the current web page is opened or loaded by clicking on a result in the result page of a previous search, the search query for the previous search can be reasonably assumed to be textually related to the current web page and therefore can be used to extract any keywords that represent the contents on the current web page. As the search query is the only information related to the contents of the current web page in the URL of the referrer, any other information included in the URL of the referrer, such as privacy information relating to the user performing the previous search, will be discarded in this process.

The identifying number of the related links identifies the particular display format the user has chosen during creation of the web page. The server uses this number to retrieve display parameters for presenting the related links. The display parameters can include, for example, the number of related links to be displayed, the font of the displayed texts, the size of the gadget for displaying the related links, whether the section for related searches should be displayed, and how many keywords are allowed to be displayed. The title of the web page can be considered to be closely related to the contents of the current web page. In the absence of a referrer to the current web page and when the body text of the current web page is not considered, the title of the web page may be the only information used to determine the keywords representative of the contents of the current web page.

In some implementations, the site owner can provide to the viewer of the web page additional related links beyond the five related links initially displayed. In this case, the gadget can additionally be provided with navigational tools that allow the user to navigate to other related links within the gadget, for example, by providing scrolling icons (e.g., scroll bars). Alternatively, the keywords used for performing the server side search may be provided in the gadget. The user may click on the anchor text of such keywords to perform further searches, e.g., the related searches 110 of FIG. 1, with the search engine to find additional web pages relating to the current web page under the same domain coverage as that for the provided related links.

In some implementations, the section of JavaScript code as shown in FIG. 3 is customized by a user during the setting up of the web page. For example, a separate application interface can be provided for configuring customized codes to be embedded in a particular web page. In this application interface, a web site owner can choose the particular layout of the gadget, for example, the number of related links to be displayed in the gadget, the font size and font color of the anchor text of these related links, whether the gadget need to include additional functions such as navigational tools, whether keywords for performing related searches should be displayed, and how many keywords should be displayed.

Once these settings have been finalized, an identifying number can be assigned to the code, for example, as shown in the parameter "relatedlinks_id" in the eighth line of the sample code shown in FIG. 3. The user can copy the section of JavaScript code generated using the application interface and embed it into one or more web pages of the user's web site. Embedding a section of JavaScript code can be realized in batch mode, for example, by creating a template web page including this JavaScript code and applying this template on all the web pages that are to include this code section. The server for processing requests for related links and/or keywords can store the identifying number included in the customized JavaScript code from a web page and present the resulting related links and/or keywords in the required format by generating a new section of JavaScript code for displaying the link data in response to the request from the requesting web page.

The HTTP protocol only recognizes a limited range of characters. The textual information included in the URLs sent over to the server can contain some characters that are not recognized by the HTTP protocol. Therefore, in some implementations, a URL encoding is performed that converts the texts into a valid ASCII format that are recognizable by the HTTP protocol. For example, The URL encoding will replace unsafe ASCII characters with "%" followed by two hexadecimal digits corresponding to the character values in the ISO-8859-1 character-set. Also, URLs cannot contain spaces. URL encoding normally replaces a space with a "+" sign.

Figure 4:
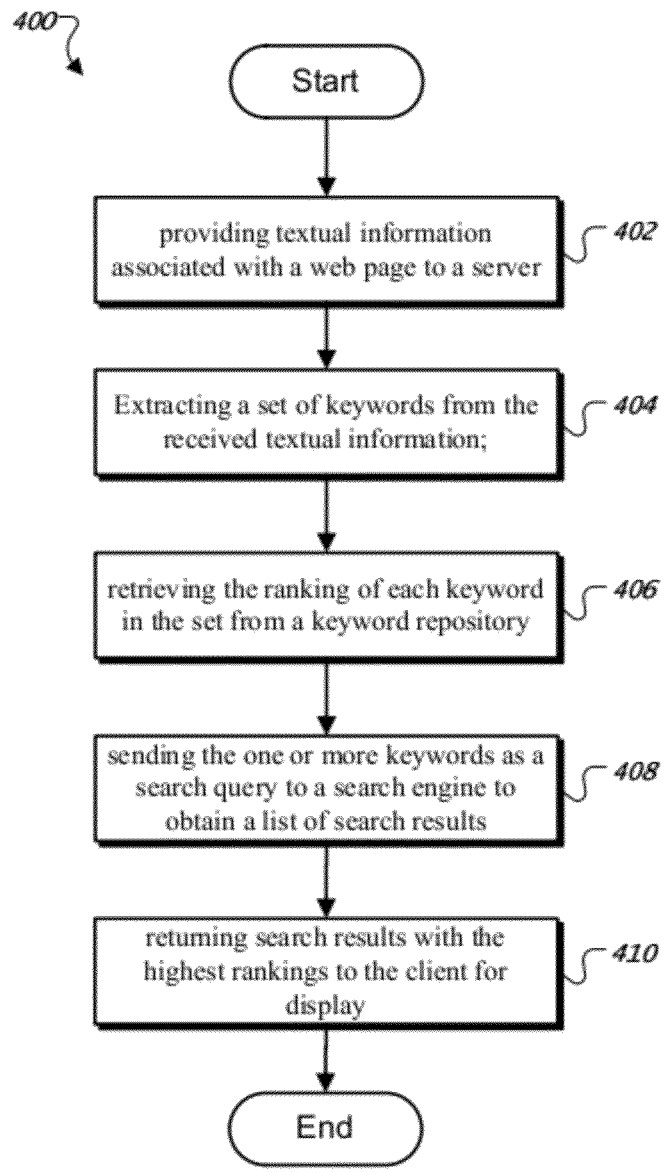
FIG. 4 is a flow chart illustrating an example process for retrieving related links for a web page.

FIG. 4 is a flow chart illustrating an example process 400 for retrieving related links for a web page. At 402, a client (e.g. client 210 of FIG. 2), retrieves textual information related to a web page to be opened (e.g., in response to a browser being directed to the web page) and sends the retrieved textual information to a server (e.g., server 220 of FIG. 2) for retrieving links to other web pages having contents are related to that of the current web page.

As shown in the example in FIG. 3, retrieving of the textual information related to the current web page can include extracting the URL of the current web page, the URL of the referrer (e.g., a URL of the page from which the user reached the web page to be opened), a search engine interface on which a search has previously been performed and the current web page is initiated as a result of clicking on one of the search results from the previous search, and the title of the current web page.

For example, as shown in FIG. 1, if the current page was opened by selecting a presented search result in a search engine interface in response to the search query "fun-mobile usabillity", the entire URL of the referrer as a result of a previous search, which includes this search query, will be extracted, and, combined with the title of the opened web page, will be sent to the server. The server identifies the search query "fun-mobile usability" used in the previous search as related to the web page currently being opened. Any other information in the URL will be discarded. In one implementation, the search query used in the previous search can be extracted from the URL of the referrer at the client, instead of the entire URL being sent to the server. However, in many cases, there may not even be a referrer, or even if there is a referrer, it may not be an interface to a particular search engine. In this case, no URL string for the referrer will be extracted. Alternatively, the extracted string only contains the web location of the referrer, without any textual information relating to the referred web page. In this situation only the title of the current web page is extracted. For example, in the case as shown in FIG. 1, only the title "fun-Mobile's UK Website Tops Usability Study" is extracted as the textual information relating to the current web page when this sample page does not have a referrer.

In some other implementations, the extracted textual information relating to the web page includes the body text in the web page being opened. The textual contents in the body text of a particular web page comprehensive data for extracting keywords or topical words or phrases representative of these contents. For example, upon loading of the web page to be viewed (e.g., in the viewer's browser), these textual contents can be sent to the server in a request for related links and/or keywords. In an alternative implementation, in order to avoid excessive transmission overhead, the client browser does not need to send the body text over to the server. Instead, the server can identify an indexed version of this page in a search index of data crawled by a search engine connected to the server, and retrieve the body text of the web page there.

Many web pages include some boilerplate contents in particular sections of the web pages. For example, some navigational instructions or copyright text can be provided at the topmost or bottom sections of a web page. These texts may not relate directly to the contents of the web page. Therefore, when the body text of a web page is to be parsed for keywords, a step of removing these boilerplate contents can be performed at the server ahead of the step of 404 in FIG. 4. Conventional techniques can be used to remove boilerplate contents from a web page prior to further processing of the body text of the web page.

At step 404, the server receives the textual information related to the web page to be opened and extracts from this textual information keywords representative of the contents in the web page. For the textual information received through the HTTP protocol, a procedure of HTTP decoding is executed to convert the textual information back to normal texts.

Language identification and word segmentation is performed on the decoded text strings to obtain a set of topical words or phrases in the identified language. For the title of the web page to be opened, the language of title is first determined. Based on this determination, a segmentation of the words or phrases in this determined language is performed. In the example as shown in FIG. 1, the title "Fun-Mobile's UK Website Tops usability study" is found to be in English and the entire text string is then segmented according to a known word segmentation technique in the language. In some implementations, the following keywords in English can be obtained for the title: "Fun-mobile", "UK", "website", "top", "usability study".

The term "keyword" is used here to indicate words or phrases that can represent a topical category of information. During this segmentation, any stop words (e.g., words or phrases that occur frequently without relation to any particular topic, and therefore do not provide relevant keyword, for example, "the" or "a") will be removed from the result set by consulting a stored list of stop words in the determined language.

Similarly, if a referrer does exist in the received textual information related to the web page to be opened, the search query previously performed is identified from the URL of the referrer, HTTP-decoded back into normal text strings, and segmented to obtain a set of words or phrases, removing any stop words that might exist in the text string. If the received textual information related to the web page to be opened also includes the body text of the web page to be opened, whether it is from the client or from a search index of a search engine, it will be similarly processed to obtain a set of keywords. All the keywords from one or more of the different sources as noted above can combine to form a general collection of keywords related to the web page to be opened at the client.

The obtained collection of keywords can be large if the title of the web page is lengthy, or if the body text of the web page has been included in the received textual information related to the web page. A subset of this collection of keywords may similarly represent the topic of the web page within a specified confidence level. Based on this recognition, a step of selecting representative keywords from the obtained collection can be performed using a keyword repository (e.g., the keyword repository 228 of FIG. 2). The keyword repository, as noted above, is a repository that stores a list of keywords and their respective rankings. It can be constructed by analyzing all the indexed data crawled by a search engine from the web and the logged history of query data input by users of the search engine.

For example, for each distinct keyword, its occurrence is calculated across all the crawled web pages. The frequency of occurrence of the keyword in the crawled web pages can be used as the ranking for this keyword. A more complicated model can be constructed for obtaining the ranking of each keyword by incorporating such factors as recency of keyword appearance, the total number of web sites where each keyword appeared, etc. As the search index covers a wide variety of the web pages on the web, the coverage of the obtained keywords can be comprehensive such that a high degree of confidence in the respective rankings can be obtained. After the keyword repository has been initially constructed, it can be updated periodically at specified intervals, for example, every three days, to reflect recent changes in the collection of keywords used by the community of users on the web.

At step 406, the ranking of each keyword in the obtained collection from the previous step 404 is obtained by consulting the keyword repository. All the keywords are then ordered by their respective rankings. The topmost one or more keywords is selected as representative of the web page to be opened at the client. These top keywords are then sent to the search engine for performing a search (step 408). In some implementations, only the topmost keyword is selected for the search. Alternatively, two or more keywords that ranked the highest in the collection of keywords can be combined in an AND relationship to form a search query to the search engine.

Furthermore, through the use of the identifying number enclosed in the request from the client, which reflects the particular preferences of the web site owner in defining how the search by the server with the search engine should be conducted and how the related links should be presented, the server retrieves the particular requirement on the domain coverage of the search and injects this preference in the search request to the search engine. If no domain limitations are identified, the search is performed across all domains.

For example, in the example web page of FIG. 1, the web site owner can have previously configured the gadget 108 to display related links within the same web site domain, and only one keyword should be used in retrieving these related links, which is "Fun-mobile" in this case, the search query sent by the server to the search engine will be "Fun-mobile site:www.example.com". The portion of the query with the domain of the web page being presented indicates that the search is limited to that domain.

Alternatively, the user may have designated a web site other than the one where the current web page is located to be searched for related links. In this case, the server will construct a similar search query by replacing the domain name in the expression "site:www.example.com" with the domain name of that other web site. If the web site owner has designated more than one web site, the server can construct a domain search query for each web site and combine the results from each domain search to obtain an aggregated set of results ordered by the respective rankings of the results.

If the search request is a one-domain search, the search engine, upon receiving the search query from the server, executes the search and returns to the server a list of search results. In some implementations, as the server already knows from the identifying number received from the client how many related links are to be presented, the server may indicate in the request sent to the search engine that a certain number of results, for example five, are needed. The search engine will, in this case, return only five search results that are ranked the highest among all the search results and return to the requesting server. The particular results returned to the server could also have been predefined in the request to the server. As an example, the server, based on the particular requirements from the client that can be determined through the identifying number included in request from the client, may return only the abstract line of textual information and the URL of each result web page as the results.

In the case of multiple domain searches, each such domain search can be performed separately at the search engine. The results of each domain search will be combined together at the server by the related links module, and re-ordered according to the ranking of each result. After that, based on the required number of related links needed, the one or more results ranked highest are selected as the results of the related search to be presented in the web page.

Upon obtaining the required search results with the highest rankings, the server, at step 410, generates a sequence of HTTP display tags enclosing the received search results in a specified gadget according to the particular identifying number received from the client. The generated HTTP codes are then returned to the requesting client to be embedded in the division container as described above with respect to FIG. 3. When the loading of the web page at the client is completed, the related links, in the required number and format, will be displayed in the specified gadget.

In some implementations, the user indicates (e.g., when setting up display parameters for the related links) that keyword links are also to be shown on the web page for performing related searches. The keyword links can be selected by the user in order to perform related searches, which can be identified by the server by accessing the particular configuration through the received identifying number. The set of one or more keywords used in performing the search for related links at step 408 will also be sent back to the requesting client to be embedded in the gadget as anchor text for performing further related searches within the same domain coverage as that for the related searches, as illustrated in section 110 of FIG. 1.

It is to be noted that the gadget to be displayed in the web page at the client does not necessarily have to be an inline rectangular block embedded in the web page. In some implementations, the gadget is presented in the form of a window hovering over the web page, or a hidden window which is configured to be triggered by either moving the mouse to a sideline of the web page or clicking on a particular place or icon embedded within the web page.

Embodiments of the subject matter and the functional operations described in this specification may be implemented in digital electronic circuitry, in tangibly-embodied computer software or firmware, in hardware, including the structures disclosed in this specification and their structural equivalents, or in combinations of one or more of them. Embodiments of the subject matter described in this specification may be implemented as one or more computer programs, i.e., one or more modules of computer program instructions encoded on a computer storage medium for execution by, or to control the operation of, data processing apparatus. Alternatively or in addition, the program instructions may be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium may be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed:

1. A method of providing related links in a web page, comprising:
   retrieving textual information associated with a web page upon loading of the web page at a client device;
   extracting, by one or more computers, a set of keywords from the received textual information, wherein the keywords are representative of content of the web page, wherein extracting the set of keywords from the received textual information includes:
      parsing the textual information associated with the web page to identify a language of the textual information,
      segmenting each text segment in the textual information into a set of separate words or phrases in accordance with the identified language of the textual information,
      removing the stop words of the identified language from the set of separate words or phrases, and
      returning the set of words or phrases as the set of keywords;
   ranking the extracted set of keywords using a keyword repository, wherein the keyword repository maintains a list of keywords and their respective rankings;
   selecting one or more representative keywords from the extracted set of keywords based on the ranking;
   sending the one or more representative keywords as a search query to a search engine to obtain a list of search results ordered by their respective rankings; and
   returning a specified number of search results with the highest rankings to the client for display, wherein the received search results are responsive to the one or more representative keywords extracted from textual information associated with a web page loading at a client device and wherein the received search results are displayed as related links within a particular designated region of the web page, wherein the related links are links to other web pages related to the loading web page.

2. The method of claim 1, wherein the rankings of the one or more keywords are the highest among the set of keywords.

3. The method of claim 1, wherein the one or more keywords are sent to the search engine to perform a search within the same web domain as that for the web page.

4. The method of claim 1, further comprising:
   returning the one or more keywords together with the number of search results to the client for display in the web page, the displayed one or more keywords being selectable to perform related searches within the same domain coverage as that for the related links.

5. The method of claim 1, wherein the textual information associated with the web page includes the title of the web page.

6. The method of claim 1, wherein the textual information associated with the web page further includes the body text on the web page.

7. The method of claim 6, further comprising excluding any boilerplate texts in the web page from the body text of the web page.

8. The method of claim 1, wherein the web page is loaded in response to a selection of one of the results from a previous search, and wherein the textual information associated with the web page further includes the search query used in performing the previous search.

9. The method of claim 1, wherein the keyword repository is constructed by performing statistical analysis on at least one of the following: the textual data on the web pages crawled by a search engine from the web; and logged query data input by users.

10. The method of claim 9, wherein the keyword repository is updated periodically to reflect recent changes in the collection of keywords used by the community of users on the web.

11. The method of claim 1, wherein determining one or more keywords with the highest ranking includes: ordering the set of keywords according to their respective rankings and returning a number of the topmost keywords as the one or more keywords with the highest ranking.

12. The method of claim 1, wherein sending the one or more keywords as search query to a search engine includes: combining the one or more keywords in an AND relationship as a search query to the search engine.

13. The method of claim 1, wherein each returned search result comprises at least the title of the web page of the search result and the URL of the web page of the search result.

14. The method of claim 13, wherein the title of the web page of each search result is displayed as anchor text and the corresponding URL of the web page is embedded as the link for the anchor text.

15. The method of claim 1, wherein the results from the server are displayed in a gadget, the gadget being one of the following: a rectangular block defined within the web page; a window hovering over the web page or a hidden window configured to be triggered by either moving the mouse to a sideline of the web page or clicking on an icon within the web page.

16. A system for providing related links in a web page, comprising:
    a client comprising a text extractor, the text extractor configured to extract textual information related to a web page and send it to a server for requesting related links; and
    the server, including one or more processors and one or more non-transitory computer readable storage media, configured to provide a keyword extractor, a related links module and a presentation module, the server being connected to a keyword repository and a search engine,
        wherein the keyword extractor is configured to extract keywords from the textual information received from the client by consulting the keyword repository, wherein extracting the keywords from the received textual information includes: parsing the textual information associated with the web page to identify a language of the textual information, segmenting each text segment in the textual information into a set of separate words or phrases in accordance with the identified language of the textual information, removing the stop words of the identified language from the set of separate words or phrases, and returning the set of words or phrases as the keywords,
        wherein the keywords are representative of content of the web page and wherein the keyword repository maintains a list of keywords and their respective rankings, the related links module is configured to retrieve search results from the search engine by sending at least one of the extracted keywords as the search query, and the presentation module is configured to present a specified number of selected search results from the search engine to the client according to the layout requirements from the client, and
        wherein the received search results are responsive to the one or more representative keywords extracted from textual information associated with a web page loading at a client device and wherein the received search results are displayed as related links within a particular designated region of the web page, wherein the related links are links to other web pages related to the loading web page.

17. A system comprising:
one or more computers including one or more processors and one or more non-transitory computer readable storage media configured to provide configured to perform operations comprising:
    retrieving textual information associated with a web page upon loading of the web page at a client device;
    extracting, using one or more computers, a set of keywords from the received textual information, wherein the keywords are representative of content of the web page, wherein extracting the set of keywords from the received textual information includes:
    parsing the textual information associated with the web page to identify a language of the textual information,
    segmenting each text segment in the textual information into a set of separate words or phrases in accordance with the identified language of the textual information,
    removing the stop words of the identified language from the set of separate words or phrases, and
    returning the set of words or phrases as the set of keywords;
    ranking the extracted set of keywords using a keyword repository, wherein the keyword repository maintains a list of keywords and their respective rankings;
    selecting one or more representative keywords from the extracted set of keywords based on the ranking;
    sending the one or more representative keywords as a search query to a search engine to obtain a list of search results ordered by their respective rankings; and
    returning a specified number of search results with the highest rankings to the client for display, wherein the received search results are responsive to the one or more representative keywords extracted from textual information associated with a web page loading at a client device and wherein the received search results are displayed as related links within a particular designated region of the web page, wherein the related links are links to other web pages related to the loading web page.

* * * * *